(12) United States Patent
Alamir et al.

(10) Patent No.: US 11,681,963 B2
(45) Date of Patent: Jun. 20, 2023

(54) METHOD AND SYSTEM FOR OPTIMIZATION OF TASK MANAGEMENT ISSUE PLANNING

(71) Applicant: JPMorgan Chase Bank, N.A., New York, NY (US)

(72) Inventors: Salwa Husam Alamir, Bournemouth (GB); Alberto Pozanco, Madrid (ES); Sameena Shah, Scarsdale, NY (US); Daniele Magazzeni, London (GB); Daniel Borrajo, Pozuelo de Alarcon (ES); Parisa Zehtabi, London (GB); Rui Manuel Ramos Teixeira da Silva, London (GB); Maria Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/222,424

(22) Filed: Apr. 5, 2021

(65) Prior Publication Data
US 2022/0318712 A1 Oct. 6, 2022

(51) Int. Cl.
*G06Q 10/0631* (2023.01)
*G06Q 10/10* (2023.01)

(52) U.S. Cl.
CPC . *G06Q 10/06316* (2013.01); *G06Q 10/06312* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 8,775,229 B1 * | 7/2014 | Danskin | G06Q 10/06312 705/7.22 |
| 2006/0053043 A1 * | 3/2006 | Clarke | G06Q 10/10 705/7.17 |
| 2007/0067196 A1 * | 3/2007 | Usui | G06Q 10/06 705/7.12 |
| 2017/0091688 A1 * | 3/2017 | Lopes | G06Q 10/0635 |
| 2017/0249574 A1 * | 8/2017 | Knijnik | G06Q 10/06313 |

(Continued)

FOREIGN PATENT DOCUMENTS

WO   WO-2022234273 A1 * 11/2022

OTHER PUBLICATIONS

Farook Hamzeh et al, Rethinking Lookahead Planning to Optimize Construction Workflow, 2011, Lean Construction Journal 2011, pp. 15-34 (Year: 2011).*

*Primary Examiner* — Amanda Gurski
(74) *Attorney, Agent, or Firm* — Greenblum & Bernstein, P.L.C.

(57) ABSTRACT

A method for optimizing personnel utilization is provided. The method includes: accessing first task management planning information that relates to a first project that has not been completed; using the accessed first task management planning information to identify a plurality of tasks to be performed in connection with the first project and to identify a plurality of persons to be assigned to respective tasks; retrieving historical task management information that relates to at least one project that has been completed; and adjusting at least a first portion of the first task management planning information based on the retrieved historical task management information.

13 Claims, 4 Drawing Sheets

(56) References Cited

U.S. PATENT DOCUMENTS

2019/0026663 A1* 1/2019 Homeyer ............ G06Q 10/0633
2019/0377602 A1* 12/2019 Mosca ..................... G06N 7/01
2020/0327467 A1* 10/2020 Davies ............. G06Q 10/06313

* cited by examiner

METHOD AND SYSTEM FOR OPTIMIZATION OF TASK MANAGEMENT ISSUE PLANNING

BACKGROUND

1. Field of the Disclosure

This technology generally relates to methods and systems for task management, and more particularly to optimizing task management issue planning by using continuous self-learning techniques.

2. Background Information

In a large organization such as a multinational corporation, project management and personnel utilization are important for sustained success and profitability. Inefficiencies in these aspects may cause competitive disadvantages and a lack of growth.

A popular mechanism for handling task management is known as Jira. Jira is a software tool developed by Atlassian Corporation and designed for bug tracking, issue tracking, and project management.

In an organization that has a large number of employees, i.e., on the order of hundreds of thousands, project planning that is performed manually by individual users may lead to sub-optimal plans that have time periods during which some employees are not assigned tasks and are generally underutilized. Accordingly, there is a need for a methodology for optimizing task management and project planning that maximizes employee efficiency.

SUMMARY

The present disclosure, through one or more of its various aspects, embodiments, and/or specific features or sub-components, provides, inter alia, various systems, servers, devices, methods, media, programs, and platforms for optimizing task management issue planning by using continuous self-learning techniques.

According to an aspect of the present disclosure, a method for optimizing task management issue planning by using continuous self-learning techniques is provided. The method is implemented by at least one processor. The method includes: accessing, by the at least one processor, first task management planning information that relates to a first project that has not been completed; retrieving, by the at least one processor, historical task management information that relates to at least one project that has been completed; and adjusting, by the at least one processor, at least a first portion of the first task management planning information based on the retrieved historical task management information.

The method may further include using the accessed first task management planning information to identify a plurality of tasks to be performed in connection with the first project and to identify a plurality of persons to be assigned to respective tasks from among the plurality of tasks.

The method may further include using the accessed first task planning information to determine an order in which the plurality of tasks are to be performed, wherein the adjusting comprises changing the determined order by shifting a relative timing of at least a first task from among the plurality of tasks so that the at least one task is to be performed before at least a second task that had previously been indicated as being performed before the at least first task.

When a first person from among the plurality of persons is indicated as being assigned to perform a first task from among the plurality of tasks, the adjusting may include reassigning the first person so that the first person is no longer assigned to perform the first task and is assigned to perform a second task from among the plurality of tasks.

The method may further include using the accessed first task management planning information to determine a first allocated time duration for completion of a first task from among the plurality of tasks by a first person from among the plurality of persons. The adjusting may include adjusting the first allocated time duration.

When an unplanned event occurs, the method may further include adjusting at least a second portion of the first task management planning information based on the occurrence of the unplanned event.

When the first project is completed, the method may further include providing data that relates to a result of the first project to a database from which the historical task management information is retrievable.

The accessing may include using a Jira application programming interface (API) to access the first task management planning information.

According to another exemplary embodiment, a computing apparatus for optimizing personnel utilization is provided. The computing apparatus includes: a processor; a memory; and a communication interface coupled to each of the processor and the memory. The processor is configured to: access first task management planning information that relates to a first project that has not been completed; retrieve historical task management information that relates to at least one project that has been completed; and adjust at least a first portion of the first task management planning information based on the retrieved historical task management information.

The processor may be further configured to use the accessed first task management planning information to identify a plurality of tasks to be performed in connection with the first project and to identify a plurality of persons to be assigned to respective tasks from among the plurality of tasks.

The processor may be further configured to use the accessed first task planning information to determine an order in which the plurality of tasks are to be performed, and to adjust the at least a first portion of the first task management planning information by changing the determined order by shifting a relative timing of at least a first task from among the plurality of tasks so that the at least one task is to be performed before at least a second task that had previously been indicated as being performed before the at least first task.

When a first person from among the plurality of persons is indicated as being assigned to perform a first task from among the plurality of tasks, the processor may be further configured to adjust the at least a first portion of the first task management planning information by reassigning the first person so that the first person is no longer assigned to perform the first task and is assigned to perform a second task from among the plurality of tasks.

The processor may be further configured to use the accessed first task management planning information to determine a first allocated time duration for completion of a first task from among the plurality of tasks by a first person from among the plurality of persons, and to adjust the at least a first portion of the first task management planning information by adjusting the first allocated time duration.

When an unplanned event occurs, the processor may be further configured to adjust at least a second portion of the first task management planning information based on the occurrence of the unplanned event.

When the first project is completed, the processor may be further configured to provide data that relates to a result of the first project to a database from which the historical task management information is retrievable.

The processor may be further configured to access the first task management planning information by using a Jira application programming interface (API).

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
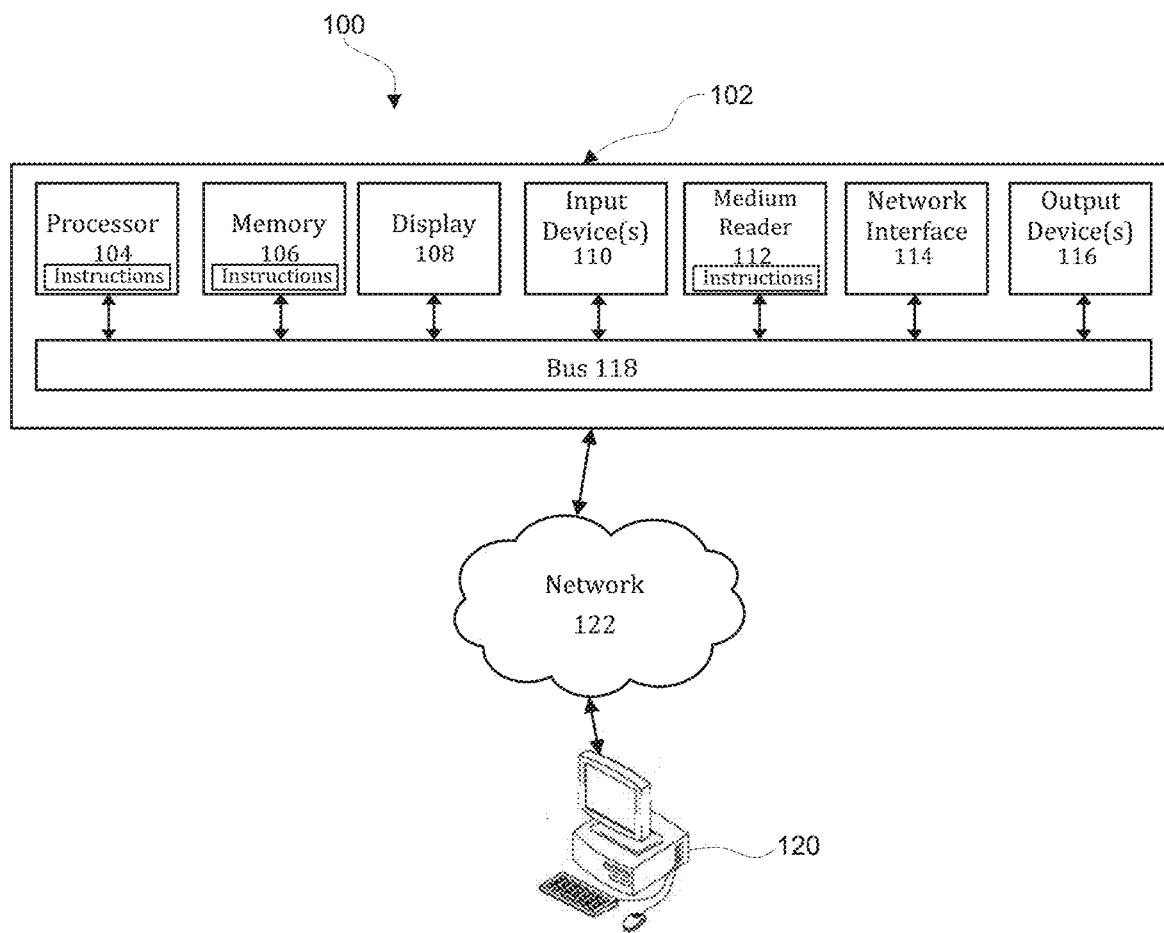
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for optimizing task management issue planning by using continuous self-learning techniques.

Figure 2:
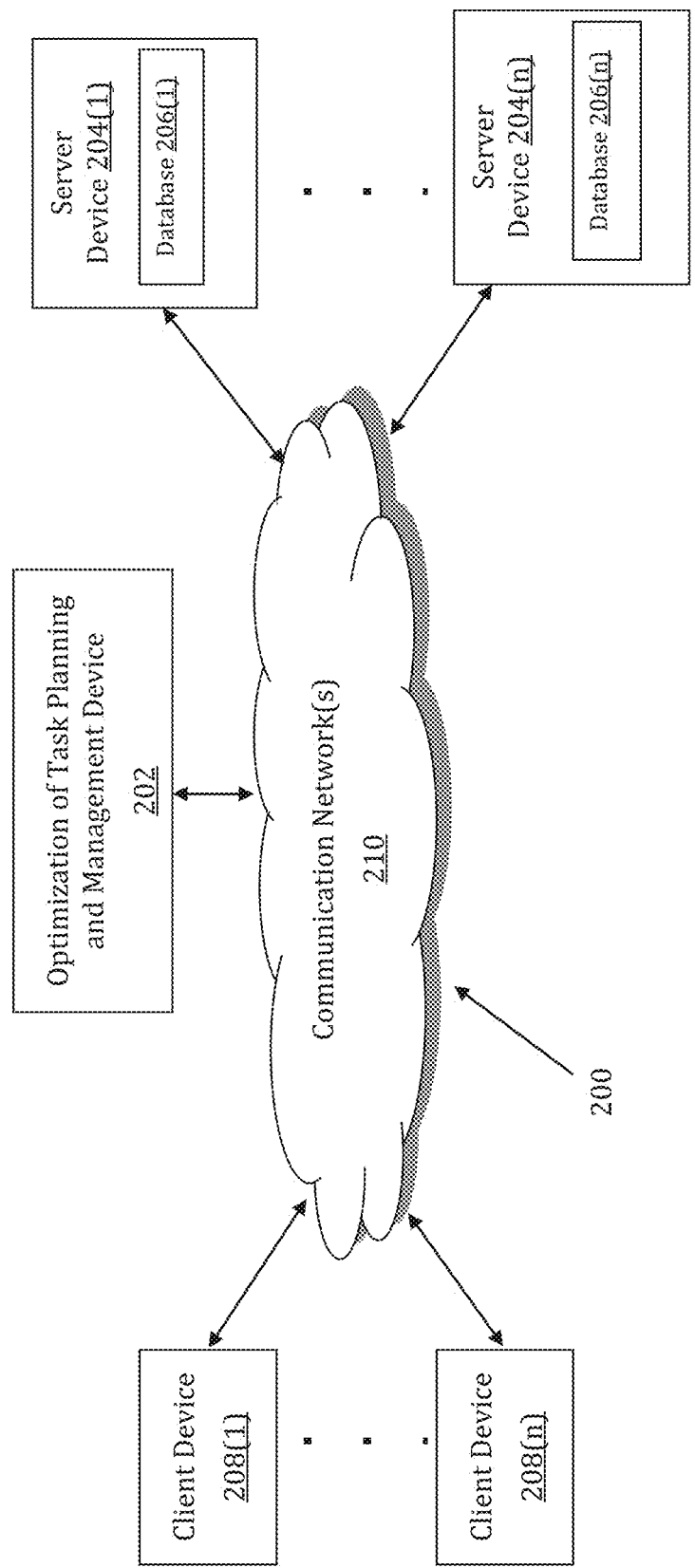
FIG. 2 illustrates an exemplary diagram of a network environment.

Referring to FIG. 2, a schematic of an exemplary network environment 200 for implementing a method for optimizing task management issue planning by using continuous self-learning techniques is illustrated. In an exemplary embodiment, the method is executable on any networked computer platform, such as, for example, a personal computer (PC).

The method for optimizing task management issue planning by using continuous self-learning techniques may be implemented by an Optimization of Task Planning and Management (OTPM) device 202. The OTPM device 202 may be the same or similar to the computer system 102 as described with respect to FIG. 1. The OTPM device 202 may store one or more applications that can include executable instructions that, when executed by the OTPM device 202, cause the OTPM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the OTPM device 202 itself, may be located in virtual server(s) running in a cloud-based computing environment rather than being tied to one or more specific physical network computing devices. Also, the application(s) may be running in one or more virtual machines (VMs) executing on the OTPM device 202. Additionally, in one or more embodiments of this technology, virtual machine(s) running on the OTPM device 202 may be managed or supervised by a hypervisor.

In the network environment 200 of FIG. 2, the OTPM device 202 is coupled to a plurality of server devices 204(1)-204(n) that hosts a plurality of databases 206(1)-206(n), and also to a plurality of client devices 208(1)-208(n) via communication network(s) 210. A communication interface of the OTPM device 202, such as the network interface 114 of the computer system 102 of FIG. 1, operatively couples and communicates between the OTPM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the OTPM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and OTPM devices that efficiently implement a method for optimizing task management issue planning by using continuous self-learning techniques.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The OTPM device 202 may be a standalone device or integrated with one or more other devices or apparatuses, such as one or more of the server devices 204(1)-204(n), for example. In one particular example, the OTPM device 202 may include or be hosted by one of the server devices 204(1)-204(n), and other arrangements are also possible. Moreover, one or more of the devices of the OTPM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the OTPM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to task management history and employee utilization.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the OTPM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the OTPM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the OTPM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the OTPM device 202, the server devices 204(1)-204(n), or the client devices 208(1)-208(n), for example, may be configured to operate as virtual instances on the same physical machine. In other words, one or more of the OTPM device 202, the server devices 204(1)-204(n), or the client devices 208(1)-208(n) may operate on the same physical device rather than as separate devices communicating through communication network(s) 210. Additionally, there may be more or fewer OTPM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
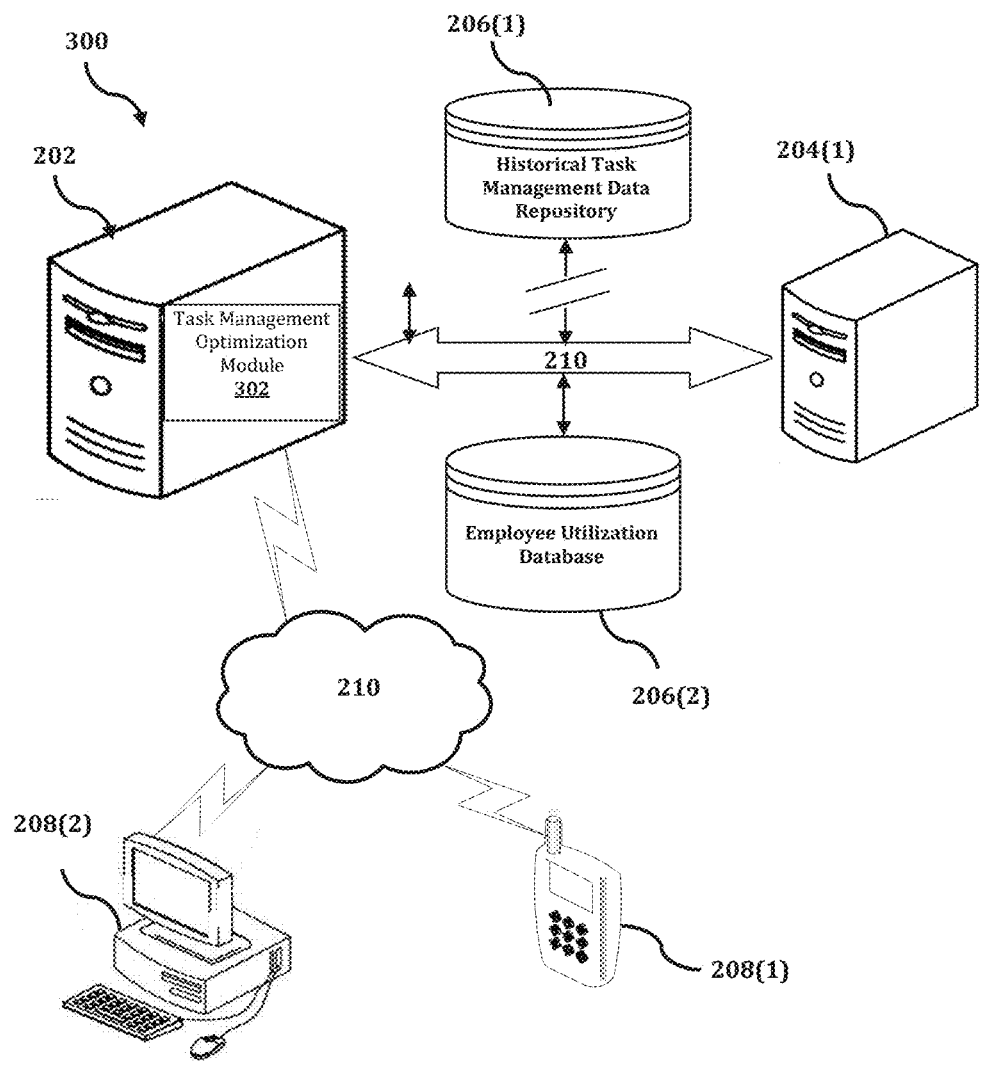
FIG. 3 shows an exemplary system for implementing a method for optimizing task management issue planning by using continuous self-learning techniques.

The OTPM device 202 is described and illustrated in FIG. 3 as including a task management optimization module 302, although it may include other rules, policies, modules, databases, or applications, for example. As will be described below, the task management optimization module 302 is configured to implement a method for optimizing task management issue planning by using continuous self-learning techniques.

An exemplary process 300 for implementing a mechanism for optimizing task management issue planning by using continuous self-learning techniques by utilizing the network environment of FIG. 2 is illustrated as being executed in FIG. 3. Specifically, a first client device 208(1) and a second client device 208(2) are illustrated as being in communication with OTPM device 202. In this regard, the first client device 208(1) and the second client device 208(2) may be "clients" of the OTPM device 202 and are described herein as such. Nevertheless, it is to be known and understood that the first client device 208(1) and/or the second client device 208(2) need not necessarily be "clients" of the OTPM device 202, or any entity described in association therewith herein. Any additional or alternative relationship may exist between either or both of the first client device 208(1) and the second client device 208(2) and the OTPM device 202, or no relationship may exist.

Further, OTPM device 202 is illustrated as being able to access a historical task management data repository 206(1) and an employee utilization database 206(2). The task management optimization module 302 may be configured to access these databases for implementing a method for optimizing task management issue planning by using continuous self-learning techniques.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the OTPM device 202 via broadband or cellular communication. Of course, these embodiments are merely exemplary and are not limiting or exhaustive.

Upon being started, the task management optimization module 302 executes a process for optimizing task management issue planning by using continuous self-learning techniques. An exemplary process for optimizing task management issue planning by using continuous self-learning techniques is generally indicated at flowchart 400 in FIG. 4.

Figure 4:
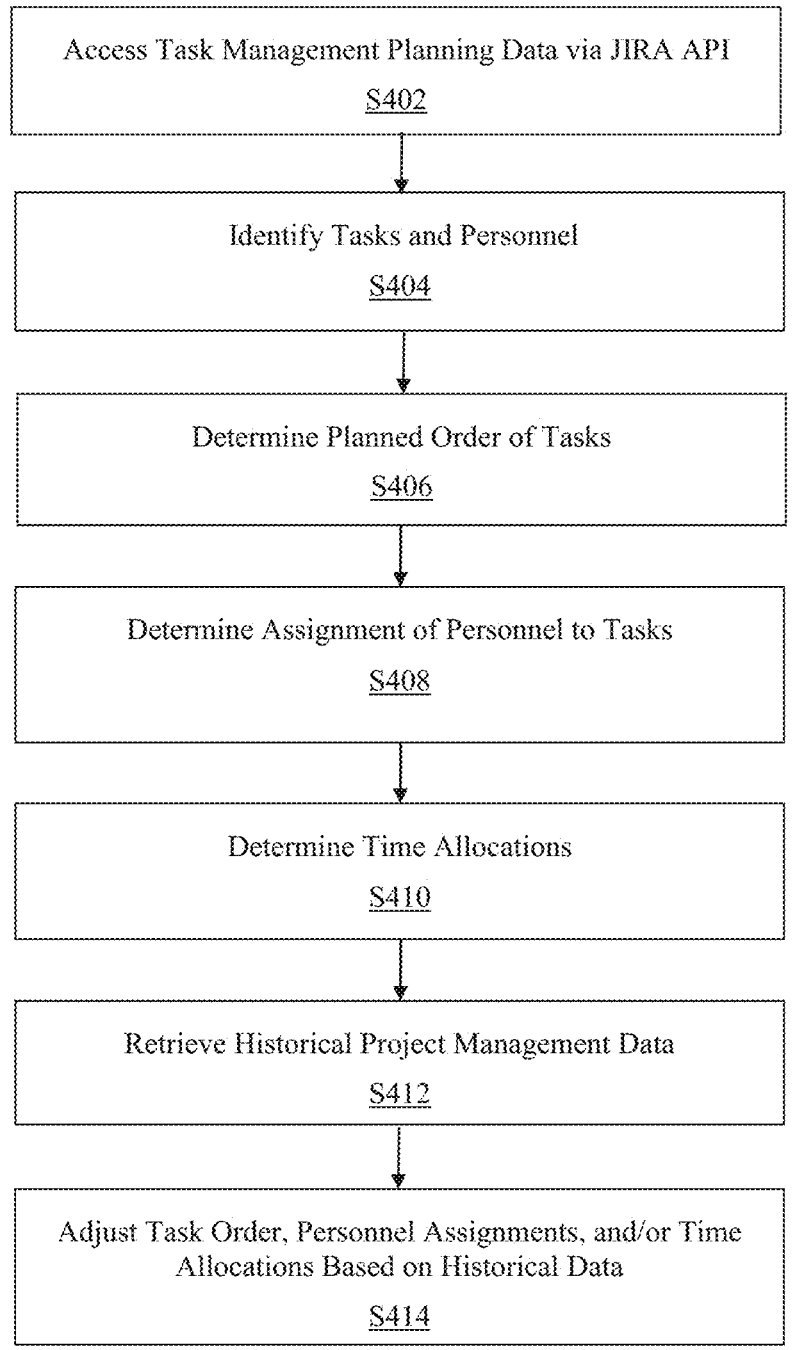
FIG. 4 is a flowchart of an exemplary process for implementing a method for optimizing task management issue planning by using continuous self-learning techniques.

In process 400 of FIG. 4, at step S402, the task management optimization module 302 accesses task management planning information that relates to an upcoming or ongoing project. In an exemplary embodiment, the accessing is executed via a Jira application programming interface (API).

At step S404, the task management optimization module 302 uses the accessed task management planning information to identify tasks to be performed in the context of the project, and also to identify persons, such as employees or other personnel, that have been or are planned to be assigned to work on the project.

At steps S406, S408, and S410, the task management optimization module 302 uses the accessed task management planning information to determine various other plans that pertain to the project. In particular, at step S406, the accessed information is used to determine the ordering of tasks, i.e., the sequence by which the tasks are planned to be executed. At step S408, the accessed information is used to determine the specific task assignments for each person identified in step S404, i.e., which tasks are assigned to which persons. At step S410, the accessed information is used to determine time allocations for each task, i.e., how much time is each person allocated to complete a particular task.

At step S412, the task management optimization module 302 retrieves historical task management information that relates to previously completed projects. In an exemplary embodiment, this historical information is stored in the historical task management data repository 206(1), which is in a continuous state of being updated by adding relevant data from newly completed projects. In this manner, a continuous self-learning aspect is provided.

At step S414, the task management optimization module 302 adjusts at least a portion of the task management planning information based on the historical information retrieved in step S412. For example, the determined ordering of tasks may be adjusted by shifting the relative timing of at least one task to be performed before another task that had previously been planned to be performed before the at least one task, i.e., if Task G was previously planned to be performed before Task J, shifting Task J so that Task J is planned to be performed before Task G.

As another example, the assignments of persons to tasks may be adjusted. For example, if Person X was originally assigned to perform Task C and Task D, this assignment may be adjusted such that Person X is assigned to perform Task D and Task F. The adjustment may include adding task assignments for a particular person, removing task assignments for the particular person, or adding some assignments and removing other assignments for the particular person. The adjustment may also relate to any number of persons.

As yet another example, the time allocations for tasks may be adjusted. For example, if Person Z is assigned to perform Task Q and has been allocated a total of 4.0 hours to complete Task Q, this allocation may be adjusted by either increasing the amount of time, e.g., changing 4.0 hours to 5.5 hours, or by reducing the amount of time, e.g., changing 4.0 hours to 3.25 hours.

The adjustments are made by using the retrieved historical information, which provides data that indicates task orders, personnel assignments, and time allocations that actually occurred during previously completed projects. By using this historical information, the task management and planning is optimized, thereby improving the likelihood that personnel resources will be utilized and future projects will be completed in a maximally efficient manner.

In an exemplary embodiment, unplanned events may occur such that the project planning is impacted. In this circumstance, the task management planning module 302 may further adjust the planning information in order to account for the unplanned event. For example, if Person A becomes unavailable due to an unexpected absence, then the tasks previously assigned to Person A may be reassigned to other persons.

In an exemplary embodiment, the task management planning module 302 tracks the progress of the project during its execution by collecting data that relates to the actual order in which the tasks are performed, the actual persons that have performed each task, and the actual amounts of time required for completing each task. Then, when the project is completed, the task management planning module 302 updates the historical task management data repository 206(1) by transmitting the collected data thereto.

Currently, planning software development is mostly performed by humans. This task requires reasoning over multiple factors and constraints. Thus, it takes humans time to generate those plans. Also, the resulting plans often do not estimate well how skillfully specific developers will address a task or how long it will take. In an exemplary embodiment, an automated approach to generating project plans, assigning human resources to tasks according to previous projects, and taking into account a variety of real constraints is presented. Machine learning is used to acquire a person's key skills based on previous development tasks performed, combined with planning technology in order to provide a unified end-to-end project management tool. This planning application has been developed within a large corporation utilizing historical data from an internal system that stores project tasks. The approach is validated by comparing plans originally proposed by humans against those generated by the planning tool. For this comparison, a set of metrics is provided for assessing different properties of the plans, such as the quality of task assignments.

Introduction: Software Project Scheduling (SPS) is an optimization problem within the broader field of Project Management that may be understood as deciding who does what and when on a software project. Conventionally, this problem is usually solved manually by project managers, who try to accommodate all the resources and constraints to create a plan that maximizes/minimizes a set of objective functions. In recent years, there have been some attempts to automate this process by using different Artificial Intelligence (AI) techniques that range from genetic algorithms to ant colony optimization. Most current AI based approaches assume a static view of the project, not considering dynamic events such as the leave of an employee or the arrival of new tasks. It is also difficult to extract explanations on the decisions taken by these algorithms, which might cause project managers to not fully trust their outputs. Moreover, given the lack of publicly available data, they usually test their models in synthetically generated benchmarks, which might undermine the credibility of the computed solutions.

In an exemplary embodiment, a planning approach to solve the SPS problem is proposed. Planning and scheduling are combined with learning techniques in order to rapidly adapt a model and thus the returned solutions to dynamic events, as well as to provide explanations to final users. In an exemplary embodiment, real data generated by Jira projects of Company X that follows an agile scrum methodology is used to evaluate the approach. Empirical results show how the model can produce fast solutions that resemble the ones generated by project managers, whose positive feedback through a user study states that the plans returned by this approach could be used within Company X.

Project Development: The software development process at many companies follows the Agile methodology. In this section, the Agile methodology is described together with Jira, which is a collaborative tool for tracking and managing projects.

In the Agile methodology for software development, a developers team $D=\{d_1, \ldots, d_D\}$ and a manager m work on a project. At any given time there exists a pool of tasks $T=\{t_1, \ldots, t_T\}$ that eventually need to be completed. The timeline of the project is divided into sprints of $L=\{1, \ldots, N\}$ days. Typically the sprints last two weeks, i.e. N=14, but this varies across teams. Before a new sprint starts, the team meets for a Sprint Planning Meeting, where they: 1) add new tasks to pool T; 2) order the tasks in the pool by priority (Low, Medium, High, Major, Show Stopper); 3) break down larger tasks into smaller more manageable subtasks; 4) add dependencies between the tasks (i.e., define task precedence); 5) estimate the complexity of the tasks using a relative scale of effort dubbed story points, which reward team members for solving problems based on complexity, and not on time spent; and, finally, 6) commit on the subset of tasks that should be completed by the end of the sprint, given the team bandwidth.

The subset of tasks to be completed in the sprint is then assigned to the developers. This process is constrained by the skills of the developers and their personal preferences. The tasks then follow a workflow. The default workflow is composed of three states: Open, In Progress and Closed. Additionally, it is also assumed that each task is assigned to a single developer, i.e., it is not reassigned between the Open and Close states. In an exemplary embodiment, the Agile methodology is supported by JIRA, and the relevant features extracted are either industry standard (i.e., story points) or mandatory fields (i.e., description and priority).

Approach: A planning approach for solving the aforementioned SPS problem is proposed, combining planning and scheduling with learning techniques. Given a task pool T and a set of developers D as inputs, the goal of the planning system is to output a schedule of tasks to be completed by each developer throughout the sprint. This scheduling process assumes a daily temporal resolution, and is constrained by different properties of the tasks and the developers, which are also provided as inputs.

Developer Skill Estimator: The developer skill estimator learns a model $S(d, t):D \times T \rightarrow [0,1]$ that estimates the expertise level of a developer d at a task t based on the tasks the developer has previously completed in the project. The more similar tasks the developer has completed, the higher its expertise. In practice, tasks are clustered based on their descriptions, and the skills of the developer are assessed in terms of the space of clusters.

Learning clusters of tasks. The first step aims to learn how to cluster project tasks into a set of task classes $C=\{c_1, \ldots, c_k\}$. For this purpose, it is assumed that tasks can be clustered based on their descriptions, which contain text paragraphs that provide technical details on the task. First, a dictionary of all the words observed in the descriptions of the tasks within the project is built. This is used to create a vector representation of the tasks based on the Term Frequency-Inverse Document Frequency (TD-IDF) method. Each task is then represented by a D-dimensional vector, where the vector task $t_j$ has i-th entry $w_j(i)=tf_{i,j} \times \log(N/df_i)$, where $t_j$, $df_i$ is the frequency of i in all task descriptions, and N is the number of previous tasks in the project.

Given the vector representation of all tasks, the Latent Dirichlet Allocation (LDA) topic modelling method is adopted in order to extract tasks clusters. Like most unsupervised clustering methods, LDA depends on a parameter k that specifies the number of clusters. For each project, a value k that leads to the highest cross-validated coherence score is selected. After trained, the LDA model allows for clustering a new task. Specifically, for a new task t, LDA: $T \rightarrow [0, 1]^k$ outputs a distribution over the set of k tasks classes C. In practice, it is assumed that each task t is classified into the highest probability cluster outputted by the LDA model. For convenience, this is denoted with C: $T \rightarrow C$.

Estimating the expertise of each developer for every task: It is assumed that the expertise of a developer d on a task t is captured by his/her expertise on the corresponding task class $c=C(t)$. Specifically, the expertise of d in task class c is defined as the normalized frequency of this class in the history of tasks the developer has completed, and can be found on JIRA.

Formally, $$S(d, t) = \frac{\sum_{t' \in \mathcal{H}(d)} \mathbb{I}(C(t') = C(t))}{|\mathcal{H}(d)|},$$

where $H(d)$ denotes the history of tasks completed by developer d, and where $\Pi(x=y)$ is the indicator function taking value one (1) if $x=y$, and zero (0) otherwise. Consequently, the expertise of a developer d at a task t grows with the number of tasks of similar class he/she has completed.

Manually Specified Inputs: Some properties of the tasks and the developers are to be estimated manually by the team, and provided as input to the planner.

Task Duration Estimator: The planner is provided a map $D:T \rightarrow [1, N]$, where $D(t)$ denotes the duration of task t in days. Moreover, it is assumed that the duration of a given task ranges between a minimum of one (1) day and a maximum of N days—the entire duration of the sprint.

Task Dependencies: The planner is provided a map $R(t)$ denoting the set of tasks that need to be completed before task t can start—i.e., its dependencies. Formally, $R:T \rightarrow P(T)$, where $P(T)$ is the power set of all tasks. If task t has no dependencies, then $R(t)=\emptyset$.

Task Priorities: The task priorities—Low, Medium, High, Major, and Show Stopper—are provided as inputs. Each is assigned a priority value in $\{1, \ldots, 5\}$. Formally, $P(t)$ denotes the priority of task t.

Planner: An Integer Linear Programming (ILP) approach is adopted to model the SPS problem as an optimization problem. This approach starts with the following binary variables that take value 1, when a) $x_{i,j}$, if task $j \in T$ is assigned to developer $i \in D$; b) $y_{i,j,k}$, if developer $i \in D$ starts task $j \in T$ on day $k \in L$; and c) $z_{i,j,k}$, if developer $i \in D$ works on task $j \in T$ on day $k \in L$, yielding a total of $(|\mathcal{T}| \times |\mathcal{D}|)+2(|\mathcal{T}| \times |\mathcal{D}| \times N)$ variables.

The objective function is defined as $$\max_{x,y,z} \sum_{\substack{i \in \mathcal{D} \\ j \in \mathcal{T}}} S(i, j)P(j)x_{i,j} - \alpha \sum_{\substack{i \in \mathcal{D}, j \in \mathcal{T} \\ k \in \mathcal{L}}} k y_{i,j,k},$$

where $\alpha$ is a normalization constant. The first term of the objective function aims to maximize the number of tasks completed, while trying to assign each task to developers with higher corresponding expertise, and also considering task priority. The second term of the objective function aims at scheduling tasks as early as possible in the sprint. This second term is weighted by a small scalar $\alpha$ as it is a secondary objective.

Number of developers per task: Each task may only start once, by letting $$\sum_{i \in \mathcal{D}, k \in \mathcal{L}} y_{i,j,k} \leq 1, \forall j \in \mathcal{T}. \tag{1}$$

Moreover, each task may only be assigned one developer:

$$\sum_{i \in \mathcal{D}} x_{i,j} \leq 1, \forall j \in \mathcal{T}. \tag{2}$$

Task dependencies: The dependencies are enforced by two sets of constraints. The first ensures any task j is only assigned if all dependencies $R(j)$ are also assigned $$\sum_{i \in \mathcal{D}} x_{i,j} \leq \sum_{i \in \mathcal{D}} x_{i,r}, \forall j \in \mathcal{T}, r \in R(j). \tag{3}$$

The second set of constraints ensures that a task j may only start after its dependencies $R(i)$ finish $$\sum_{i \in \mathcal{D}} \sum_{k'=1}^{k+D(r)} y_{i,j,k'} \leq \left(1 - \sum_{i \in \mathcal{D}} y_{i,r,k}\right) N, \tag{4}$$

$$\forall j \in \mathcal{T}, r \in R(j), k \in \{1, \ldots, N - D(r)\}.$$

This constraint enforces that, if a dependency $r \in R(j)$ starts on a day k by some developer i (i.e., $y_{i,r,k}=1$), then task j may only start after r finishes at $k+D(r)$.

Multi-tasking: On any given day, a developer i may work on at most $t_{max}$ tasks in parallel. This is enforced by the following set of constraints:

$$\sum_{j \in \mathcal{T}} z_{i,j,k} \leq t_{max}, \forall i \in \mathcal{D}, k \in \mathcal{L}. \tag{5}$$

Makespan: A task j may only start on a day k if it can be completed within the sprint $$y_{i,j,k}=0, \forall i \in \mathcal{D}, j \in \mathcal{T}, k \in \{N-D(t), \ldots, N\}. \tag{6}$$

Connections Between Variables: The final set of constraints establishes the connections between the different decision variables in the model. A task j may only start on some day k if it is assigned to some developer i $$\sum_{k \in \mathcal{L}} y_{i,j,k} = x_{i,j}, \forall\, i \in \mathcal{D}, j \in \mathcal{T}. \quad (7)$$

Finally, if a developer i is assigned to task j, then i must be busy with j for the duration of the task $$\sum_{k \in \mathcal{L}} z_{i,j,k} = D(j)x_{i,j}, \forall\, i \in \mathcal{D}, j \in \mathcal{T}. \quad (8)$$

These constraints indirectly connect variables y and z, rendering it redundant to specify their direct connection.

Task Assignment: The task assignments generated by the planner associate tasks to developers and days of the sprint. Formally, for a given developer $i \in D$ and day $j \in L$, the assignment may map to either a task t, or none if no tasks are to be performed by the developer on that day.

Accordingly, with this technology, an optimized process for optimizing task management issue planning by using continuous self-learning techniques is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for optimizing personnel utilization, the method being implemented by at least one processor, the method comprising:
   identifying and acquiring, using a machine learning algorithm executed by the at least one processor, a skill set of a plurality of persons to assemble a project team for a first project that has not been completed;
   identifying a plurality of previous tasks performed in a plurality of previous projects;
   clustering, via the machine learning algorithm executed by the at least one processor, the plurality of previous tasks into a set of task classes, the clustering performed by creating a vector representation of the plurality of previous tasks based on a Term-Frequency-Inverse Document Frequency (TD-IDF) operation performed on technical details corresponding to each of the plurality of previous tasks;
   extracting task clusters, from the vector representations of the plurality of previous tasks and using the machine learning algorithm, via Latent Dirichlet Allocation (LDA) topic modelling, and wherein the LDA depends on a target parameter that specifies a number of clusters, and wherein a parameter value of each project that leads to highest cross-validated coherence score is set as the target parameter;
   training the LDA model via the plurality of previous projects for clustering of a new task;
   accessing, by the at least one processor, first task management planning information that relates to the first project that has not been completed, wherein the first task management planning information includes:
      identification of a plurality of tasks to be performed in the first project,
      determination of planned order for execution of the plurality of tasks to be performed,
      determination of assignments of the plurality of persons in the project team to the plurality of tasks based on the planned order for execution, and
      determination of time allocations for the plurality of tasks to be performed by the plurality of persons in the project team for performing the plurality of tasks;
   retrieving, by the at least one processor and from a server via a network, historical task management information that relates to at least one project that has been completed;
   first adjusting, by the at least one processor and via the machine learning algorithm, at least a first portion of the first task management planning information based on the retrieved historical task management information;
   tracking execution status of the first project by collecting data that relates to actual order in which the plurality of tasks are performed, actual persons that have performed the plurality of tasks, and actual amount of time that have performed on the plurality of tasks;
   tracking, via a network environment, availability information of the plurality of persons assigned to the plurality of tasks of the first project;
   dynamically second adjusting, by the at least one processor and via the machine learning algorithm, at least a second portion of the first task management planning information based on the tracking of the execution status and the availability information; and
   updating the machine learning algorithm based on the second adjusting via a continuous unsupervised machine learning for outputting a more accurate project plan for subsequent projects.

2. The method of claim 1, wherein the first adjusting comprises changing the determined order by shifting a relative timing of at least a first task from among the plurality of tasks so that the at least one task is to be performed before at least a second task that had previously been indicated as being performed before the at least first task.

3. The method of claim 1, wherein, when a first person from among the plurality of persons is indicated as being assigned to perform a first task from among the plurality of tasks, the first adjusting comprises reassigning the first person so that the first person is no longer assigned to perform the first task and is assigned to perform a second task from among the plurality of tasks.

4. The method of claim 1, wherein the determination of the time allocations includes determining a first allocated time duration for completion of a first task from among the plurality of tasks by a first person from among the plurality of persons, and wherein the first adjusting comprises adjusting the first allocated time duration to be longer or shorter and further adjusting timing of subsequent tasks.

5. The method of claim 1, wherein when the first project is completed, the method further comprises providing data that relates to a result of the first project to a database from which the historical task management information is retrievable.

6. The method of claim 1, wherein the accessing comprises using a Jira application programming interface (API) to access the first task management planning information.

7. A computing apparatus for optimizing personnel utilization, the computing apparatus comprising:
   a processor;
   a memory; and
   a communication interface coupled to each of the processor and the memory,
   wherein the processor is configured to:
   identify and acquire, using a machine learning algorithm, a skill set of a plurality of persons to assemble a project team for a first project that has not been completed;
   identify a plurality of previous tasks performed in a plurality of previous projects;
   cluster, via the machine learning algorithm, the plurality of previous tasks into a set of task classes, the clustering performed by creating a vector representation of the plurality of previous tasks based on a Term-Frequency-Inverse Document Frequency (TD-IDF) operation performed on technical details corresponding to each of the plurality of previous tasks;
   extract task clusters, from the vector representations of the plurality of previous tasks and using the machine learning algorithm, via Latent Dirichlet Allocation (LDA) topic modelling, and wherein the LDA depends on a target parameter that specifies a number of clusters, and wherein a parameter value of each project that leads to highest cross-validated coherence score is set as the target parameter;

train the LDA model via the plurality of previous projects for clustering of a new task;

access first task management planning information that relates to the first project that has not been completed, wherein the first task management planning information includes:
  identification of a plurality of tasks to be performed in the first project,
  determination of planned order for execution of the plurality of tasks to be performed,
  determination of assignments of the plurality of persons in the project team to the plurality of tasks based on the planned order for execution, and
  determination of time allocations for the plurality of tasks to be performed by the plurality of persons in the project team for performing the plurality of tasks;

retrieve, from a server via a network, historical task management information that relates to at least one project that has been completed;

first adjust, via the machine learning algorithm, at least a first portion of the first task management planning information based on the retrieved historical task management information;

track execution status of the first project by collecting data that relates to actual order in which the plurality of tasks are performed, actual persons that have performed the plurality of tasks, and actual amount of time that have performed on the plurality of tasks; and track, via a network environment, availability information of the plurality of persons assigned to the plurality of tasks of the first project;

dynamically second adjust, via the machine learning algorithm, at least a second portion of the first task management planning information based on the tracking of the execution status and the availability information; and update the machine learning algorithm based on the second adjustment via a continuous unsupervised machine learning to output a more accurate project plan for subsequent projects.

8. The computing apparatus of claim 7, wherein the first adjust includes changing the determined order by shifting a relative timing of at least a first task from among the plurality of tasks so that the at least one task is to be performed before at least a second task that had previously been indicated as being performed before the at least first task.

9. The computing apparatus of claim 7, wherein, when a first person from among the plurality of persons is indicated as being assigned to perform a first task from among the plurality of tasks, the processor is further configured to first adjust the at least a first portion of the first task management planning information by reassigning the first person so that the first person is no longer assigned to perform the first task and is assigned to perform a second task from among the plurality of tasks.

10. The computing apparatus of claim 7, wherein the determination of the time allocations includes determining a first allocated time duration for completion of a first task from among the plurality of tasks by a first person from among the plurality of persons, and to first adjust the at least a first portion of the first task management planning information by adjusting the first allocated time duration to be longer or shorter and further adjusting timing of subsequent tasks.

11. The computing apparatus of claim 7, wherein when the first project is completed, the processor is further configured to provide data that relates to a result of the first project to a database from which the historical task management information is retrievable.

12. The computing apparatus of claim 7, wherein the processor is further configured to access the first task management planning information by using a Jira application programming interface (API).

13. The method of claim 1, wherein the skill set is identified and acquired at a task level of a project based on one or more tasks completed in the at least one project that has been completed.

\* \* \* \* \*